United States Patent Office 3,342,905
Patented Sept. 19, 1967

3,342,905
S-(N-ALKOXYAMIDO)THIOPHOSPHORAMIDES
Sidney B. Richter, Chicago, Ill., assignor to Velsicol Chemical Corporation, Chicago, Ill., a corporation of Illinois
No Drawing. Filed Aug. 4, 1964, Ser. No. 387,491
10 Claims. (Cl. 260—943)

This invention relates to new chemical compositions of matter. More specifically, this invention relates to new chemical compounds of the formula

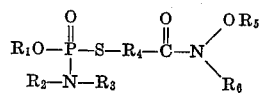

wherein $R_1$, $R_2$, $R_3$, $R_5$, and $R_6$ are independently selected from the group consisting of hydrogen and alkyl groups containing from one to ten carbon atoms; and $R_4$ is selected from the group consisting of alkylene groups containing from one to ten carbon atoms. In a preferred embodiment of this invention, the above mentioned alkyl and alkylene groups each contain from one to four carbon atoms. These new chemical compounds are useful as pesticides, particularly as insecticides, miticides, and nematocides.

The new compounds of this invention can be prepared readily from the corresponding alkali metal salts of the O-alkyl-amido-thiolphosphoric acid intermediates. These intermediates having the formula $$R_1O—P(O)(NR_2R_3)(S—Na)$$

wherein $R_1$, $R_2$ and $R_3$ are as described above are reacted with the corresponding known N-alkoxy-N-alkyl-haloalkylamides of the formula $$Cl—R_4—C(O)N(OR_5)(R_6)$$

wherein $R_4$, $R_5$ and $R_6$ are as described above to form the desired compounds of the present invention. In a preferred embodiment of this invention an excess of the alkali metal salt is used and in a most preferred embodiment about a ten percent excess of the salt concentration over the amide concentration is employed.

The alkali metal salts of the O-alkyl-amido-thiolphosphoric acid can be prepared by a two-step synthesis. The starting material is the corresponding dialkyl halothionophosphate of the formula $(R_1O)_2P(S)(Cl)$ wherein $R_1$ is as described above. It is treated with a suitable amine of the formula $HN(R_2)(R_3)$ or amine hydrochloride of the formula $HN(R_2)(R_3) \cdot HCl$ wherein $R_2$ and $R_3$ are as described above. When the free amine is employed, an amount about double the molar concentration of the starting material should be used. When the amine is used in the form of its hydrochloride, an amount at least about equimolar with the starting material should be employed, with the preferred molar concentration of the amine hydrochloride being slightly greater than the molar concentration of the starting material. Also, when the amine hydrochloride is used, an acid scavenger such as a tertiary amine should be employed in an amount about double the molar concentration of the amine hydrochloride present. The resulting product is then treated with alkali such as potassium hydroxide, sodium hydroxide and the like in a molar ratio of about one part of the product of step one to about one part alkali, to yield the alkali metal salt of O-alkyl-amido-thionophosphoric acid, having the formula $R_1O—P(S)(NR_2R_3)(O—Na)$ wherein $R_1$, $R_2$, and $R_3$ are as described above. These salts are capable of reacting through rearrangement, in the form of the desired alkali metal salts of the O-alkyl-amido-thiolphosphoric acids.

Suitable dialkyl halothionophosphate starting materials are known to the art. Examples thereof are dimethylthionochloridate, dimethylthionobromidate, diethylthionochloridate, diethylthionobromidate, di - n - propylthionochloridate, diisopropylthionochloridate, di-n-butylthionochloridate, di-sec-butylthionochloridate, di-tert-butylthionochloridate, dipentylthionochloridate, dihexylthionochloridate, diheptylthionochloridate, dioctylthionochloridate, dinonylthionochloridate, didecylthionochloridate, and the like.

Exemplary amines suitable for the treatment of the aforementioned phosphates are also known to the art, some of them are methylamine, dimethylamine, ethylamine, diethylamine, n-propylamine, di-n-propylamine, isopropylamine, diisopropylamine, n-butylamine, sec-butylamine, tert-butylamine, di-n-butylamine, di-sec-butylamine, di-tert-butylamine, pentylamine, dipentylamine, hexylamine, dihexylamine, heptylamine, diheptylamine, octylamine, dioctylamine, nonylamine, dinonylamine, decylamine, didecylamine and the like.

Suitable N-alkoxy-N-alkylhaloalkyl amides which can be reacted with the metal salts of the O-alkyl amido-thiolphosphoric acids to give the desired product of the present invention are N-methoxy-N-methyl α-chloroacetamide, N-ethoxy-N-ethyl α-chloroacetamide, N-methoxy-N-ethyl α-chloroacetamide, N-ethoxy-N-methyl α-chloroacetamide, N-methoxy-N-n-propyl α-chloroacetamide, N-methoxy-N-isopropyl α-chloroacetamide, N-n-propoxy-N-propyl α-chloroacetamide, N-isoproxy-N-isopropyl α-chloroacetamide, N-butoxy-N-butyl α-chloroacetamide, N-pentoxy-N-pentyl α-chloroacetamide, N - hexoxy - N - hexyl α-chloroacetamide, N-heptoxy-N-heptyl α-chloroacetamide, N-octoxy-N-octyl α-chloroacetamide, N-nonoxy-N-nonyl α-chloroacetamide, N-decoxy-N-decyl α-chloroacetamide, N-methoxy-N-methyl α-chloropropionamide, N - ethoxy-N-ethyl α - chloropropionamide, N-methoxy-N-n-propyl α-chloropropionamide, N-n-propoxy-N-methyl α-chloropropionamide, N-methoxy-N-isopropyl α-chloropropionamide, and the like.

The manner in which new compounds of this invention can be prepared is illustrated in the following examples:

EXAMPLE 1

*Preparation of O,O-diethyl-N,N-dimethylthionophosphoramidate*

Diethylthionophosphochloridate (40 g., 0.21 mole), dimethylamine hydrochloride (17 g., 0.21 mole) and triethylamine (42 g.) in benzene (100 ml.) were placed into a 250 ml. flask and refluxed with stirring for 17 hours. The reaction mixture was cooled to room temperature and filtered. The filter cake was washed with benzene and the washings were combined with the filtrate. This combined solution was evaporated under reduced pressure on a steam bath and the residue was vacuum distilled to yield O,O-diethyl-N,N-dimethylthionophosphoramidate.

EXAMPLE 2

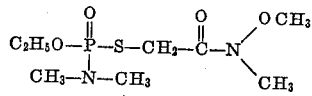

O,O-diethyl-N,N-dimethylthionophosphoramidate (8 g.; 0.041 mole) was treated with 85% pure potassium hydroxide (2.8 g.; .043 mole) dissolved in absolute ethanol (50 ml.) in a 250 ml. flask. The reaction mixture was refluxed for 17 hours with stirring. The excess solvent was removed under reduced pressure with heating and the residue was allowed to cool to room temperature and then washed two times with ether. This residue was then treated with N-methoxy-N-methyl α-chloroacetamide (4.1 g.; .03 mole) dissolved in absolute ethanol (50 ml.). The reaction mixture was refluxed with stirring for 17 hours in a 250 ml. flask and then cooled to room temperature and filtered. The filter cake was washed with ethanol and the washings were combined with the filtrate. This combined solution was evaporated under reduced pressure on a steam bath. The residue from this evaporation was dissolved in chloroform, washed with water and dried over magnesium sulfate. The solution was then filtered and evaporated under reduced pressure on a steam bath. Evaporation was continued for an additional hour under a vacuum pressure of 0.1 mm. Hg to yield O-ethyl-S-[N'-methoxy-N' - methylacetamido] - N,N' - dimethylthiophosphoramide.

Analysis for C$_8$H$_{19}$O$_4$PS: Theory N, 10.37%. Found N, 10.06%.

EXAMPLE 3

*Preparation of O,O-diethyl-N-isopropylthionophosphoramidate*

Diethylthionophosphochloridate (40 g.; 0.21 mole) and isopropylamine (25 g.; 0.41 mole) in benzene (100 ml.) were placed into a 250 ml. flask and refluxed with stirring for 17 hours. The reaction mixture was cooled to room temperature and filtered. The filter cake was washed with benzene and the washings were combined with the filtrate. This combined solution was evaporated under reduced pressure on a steam bath and the residue was vacuum distilled to yield O,O-diethyl-N-isopropylthionophosphoramidate.

EXAMPLE 4

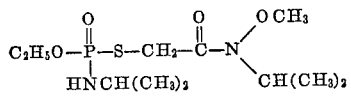

O,O-diethyl - N-isopropylthionophosphoramidate (31.7 g.; 0.15 mole) was treated with 85% pure potassium hydroxide (10 g.; 0.15 mole) dissolved in absolute ethanol (250 ml.) in a 500 ml. flask. This reaction mixture was refluxed for 17 hours with stirring. The excess solvent was removed under reduced pressure with heating and the residue was allowed to cool to room temperature and then washed thoroughly with ether. A portion of this residue (9.0 g.; .04 mole) was treated with N-methoxy-N-isopropyl α-chloroacetamide (50 g.; .03 mole) and benzene (150 ml.) in a 300 ml. round bottomed flask. The mixture was stirred and heated to reflux and allowed to reflux with stirring overnight. The reaction mixture was cooled and then filtered. The benzene was removed from the filtrate by aspiration. The residual oil was dissolved in ether and the ether solution was washed twice with water. The ether was then dried over anhydrous magnesium sulfate. The magnesium sulfate was filtered off and the ether was removed by aspiration leaving a yellow oil. This oil was subjected to aspiration by means of a vacuum pump and was allowed to be so aspirated overnight. The oil was then filtered through "super cel" (suction filtration). This product was again filtered yielding O-ethyl-S-[N' - methoxy-N' - isopropylacetamido]-N-isopropylthiophosphoramide.

Analysis for C$_{11}$H$_{25}$N$_2$O$_4$PS: Theory S, 10.25%; P, 9.93%. Found S, 10.94; P, 9.73.

EXAMPLE 5

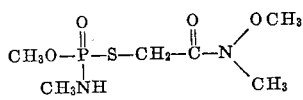

Dimethylthionophosphochloridate (32 g.; 0.20 mole) and methylamine hydrochloride (6.5 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2, to obtain O-methyl-S-[N'-methoxy-N'-methylacetamido]-N-methylthiophosphoramide.

EXAMPLE 6

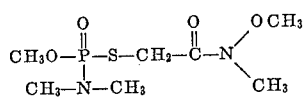

Dimethylthionophosphochloridate (32 g.; 0.20 mole) and dimethylamine hydrochloride (9.4 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2, to obtain O-methyl-S-[N'-methoxy-N'-methylacetamido]-N,N-dimethylthiophosphoramide.

EXAMPLE 7

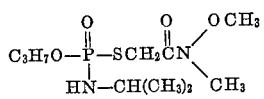

Di - n - propylthionophosphochloridate (43.2 g.; 0.20 mole) and isopropylamine hydrochloride (12.2 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2, to obtain O-n-propyl-S-[N' - methoxy - N' - methylacetamido]-N-isopropylthiophosphoramide.

EXAMPLE 8

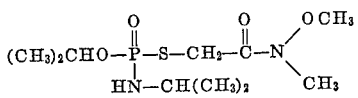

Diisopropylthionophosphochloridate (43.0 g.; 0.20 mole) and isopropylamine hydrochloride (9.5 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2, to obtain O-isopropyl-S-[N'-methoxy - N' - methylacetamido]-N-isopropylthiophosphoramide.

EXAMPLE 9

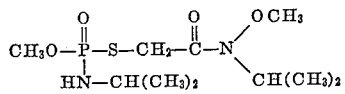

Dimethylthionophosphochloridate (37.4 g.; 0.20 mole) and isopropylamine hydrochloride (9.5 g.; 0.21 mole) are reacted according to the procedure of Example 1. The product obtained is treated with potassium hydroxide (11.2 g.; 0.20 mole) and N-methoxy-N-isopropyl α-chloroacetamide (24.8 g.; 0.15 mole) according to the procedure of Example 2 to obtain O-methyl-S-(N'-methoxy - N' - isopropylacetamido) - N-isopropylthiophosphoramide.

EXAMPLE 10

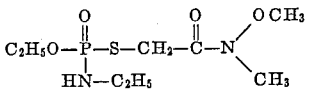

Diethylthionophosphochloridate (37.4 g.; 0.20 mole) and ethylamine hydrochloride (9.5 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2 to obtain O-ethyl-S-(N'-methoxy-N'-methylacetamido)-N-ethylthiophosphoramide.

EXAMPLE 11

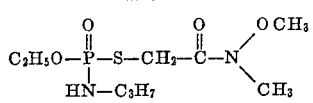

Diethylthionophosphochloridate (37.4 g.; 0.20 mole) and n-propylamine hydrochloride (12.4 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2 to obtain O - ethyl - S - (N'-methoxy-N'-methylacetamido)-N-n-propylthiophosphoramide.

EXAMPLE 12

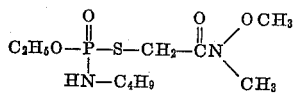

Diethylthionophosphochloridate (37.4 g.; 0.20 mole) and n-butylamine hydrochloride (15.3 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2 to obtain O - ethyl - S-(N'-methoxy-N'-methylacetamido)-N-n-butylthiophosphoramide.

EXAMPLE 13

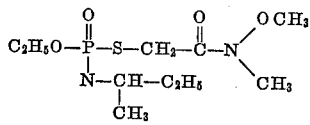

Diethylthionophosphochloridate (37.4 g.; 0.20 mole) and sec-butylamine hydrochloride (15.3 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2 to obtain O-ethyl-S-(N'-methoxy-N'-methyl-acetamido)-N-sec-butylthiophosphoramide.

EXAMPLE 14

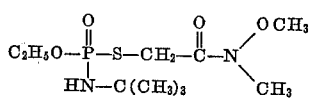

Diethylthionophosphochloridate (37.4 g.; 0.20 mole) and tert-butylamine hydrochloride (15.3 g.; 0.21 mole) are reacted according to the procedure of Example 1. The product obtained is treated with potassium hydroxide (11.2 g.; 0.20 mole) and N-methoxy-N-methyl α-chloroacetamide (18 g.; 0.15 mole) according to the procedure of Example 2 to obtain O-ethyl-S-(N'-methoxy-N'-methyl-acetamido)-N-tert-butylthiophosphoramide.

EXAMPLE 15

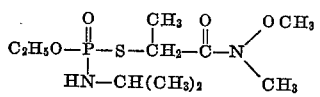

Diethylthionophosphochloridate (37.4 g.; 0.20 mole) and isopropylamine hydrochloride (12.4 g.; 0.21 mole) are reacted according to the procedure of Example 1. The product obtained is treated with potassium hydroxide (11.2 g.; 0.20 mole) and N-methoxy-N-methyl α-chloro-α-methylacetamide (22.6 g.; 0.15 mole) according to the procedure of Example 2 to obtain O-ethyl-S-(N'-methoxy-N'-methyl-α-methylacetamido) - N - isopropylthiophosphoramide.

EXAMPLE 16

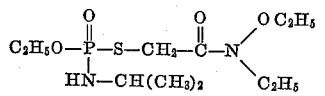

Diethylthionophosphochloridate (37.4 g.; 0.20 mole) and isopropylamine hydrochloride (12.4 g.; 0.21 mole) are reacted according to the procedure of Example 1. The product obtained is treated with potassium hydroxide (11.2 g.; 0.20 mole) and N-ethoxy-N-ethyl α-chloroacet-amide (24.6 g.; 0.15 mole) according to the procedure of Example 2 to obtain O-ethyl-S-(N'-ethoxy-N'-ethyl-acetamido)-N-isopropylthiophosphoramide.

It will be readily recognized that in view of the preparation procedure detailed in the above examples, one skilled in the art could now prepare other compounds within the scope of the present invention from the appropriate starting materials heretofore described. Thus by way of illustration, the appropriate starting materials and reactants required to prepare the named compounds of the present invention are presented in the examples below. These examples are given for the purpose of further illustrating the present invention without, however, limiting it thereto.

EXAMPLE 17

Di-n-butylthionophosphochloridate+isopropylamine
+potassium hydroxide+N-methoxy-N-methyl
α-chloroacetamide=O-n-butyl-S-(N'-methoxy-N'-methylacetamido)-N-isopropylthiophosphoramide

EXAMPLE 18

Di-sec-butylthionophosphochloridate+isopropylamine
+potassium hydroxide+N-methoxy-N-methyl
α-chloroacetamide=O-sec-butyl-S-(N'-methoxy-N'-methylacetamido)-N-isopropylthiophosphoramide

EXAMPLE 19

Di-tert-butylthionophosphchloridate+isopropylamine
+potassium hydroxide+N-methoxy-N-methyl
α-chloroacetamide=O-tert-butyl-S-(N'-methoxy-N'-methylacetamido)-N-isopropylthiophosphoramide

EXAMPLE 20

Diethylthionophosphochloridate+di-n-propylamine
+potassium hydroxide+N-methoxy-N-methyl
α-chloroacetamide=O-ethyl-S-(N'-methoxy-N'-methylacetamido)-N,N-di-n-propylthiophosphoramide

EXAMPLE 21

Diethylthionophosphochloridate+diisopropylamine
+potassium hydroxide+N-methoxy-N-methyl
α-chloroacetamide=O-ethyl-S-(N'-methoxy-N-methylacetamido)-N,N-diisopropylthiophosphoramide

EXAMPLE 22

Diethylthionophosphochloridate+isopropylamine
+potassium hydroxide+N-methoxy-N-methyl
α-chloro-n-butyramide=O-ethyl-S-(N'-methoxy-N'-methyl-n-butyramido)-N-isopropylthiophosphoramide

EXAMPLE 23

Diethylthionophosphochloridate+isopropylamine
+potassium hydroxide+N-ethoxy-N-methyl α-chloro
acetamide=O-ethyl-S-(N'-ethoxy-N'-methylacetamido)-N-isopropylthiophosphoramide

EXAMPLE 24

Diethylthionophosphochloridate+isopropylamine
+potassium hydroxide+N-n-propoxy-N-n-propyl
α-chloroacetamide=O-ethyl-S-(N'-n-propoxy-N'-n-propylacetamido)-N-isopropylthiophosphoramide

EXAMPLE 25

Diethylthionophosphochloridate+isopropylamine
+potassium hydroxide+N-isopropoxy-N-isopropyl
α-chloroacetamide=O-ethyl-S-(N'-isopropoxy-N'-isopropylacetamido)-N-isopropylthiophosphoramide For practical use as insecticides, miticides and nematocides the compounds of this invention are generally incorporated into insecticidal, miticidal and nematocidal compositions which comprise an inert carrier and an insecticidally, miticidally or nematocidally toxic amount of such a compound. Such compositions, which are usually known in the art as formulations, enable the active compound to be applied conveniently to the site of the insect, mite or nematode infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides, miticides or nematocides can be dispersed under superatmospheric pressure as aerosols. However, preferred liquid insecticidal, miticidal and nematocidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect, mite or nematode infestation. The emulsifiers most commonly used in these concentrates are nonionic or mixtures of nonionic with anionic surface-active agents.

A typical composition according to this invention is illustrated by the following example, in which the quantities are in parts by weight.

EXAMPLE 27

*Preparation of a dust*

Product of Example 2 ---------------------------- 10
Powdered talc ---------------------------------- 90

The above ingredients are mixed in a mechanical grinder-blender and are ground until a homogeneous, free-flowing dust of the desired particle size is obtained. This dust is suitable for direct application to the site of the insect, mite or nematode infestation.

The insecticides, miticides and nematocides of this invention can be applied in any manner recognized by the art. The concentration of the new compounds of this invention in the insecticidal, miticidal or nematocidal compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns, and rhizomes are thus more apt to be infected than above-ground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifested as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcast applications to the soil before planting by conventional plow or disc methods are effective, specialized methods such as row placement application, split-dosage applications, post-planting sidedress applications, and the like are also useful. The active compounds of this invention are applied in amounts sufficient to exert the desired nematocidal action. The amount of the active compound present in the nematocidal compositions as actually applied for preventing or controlling nematode infestations varies with the type of application, the particular species which are to be controlled, and the purpose for which the treatment is made, and the like.

The utility of the compounds of the present invention was illustrated, for example, by experiments carried out for the control of insects. The test compound was formulated by dissolving the compound in acetone and dispersing the acetone solution in distilled water 0.2% by volume of alkyl aryl polyether alcohol type emulsifier.

In one experiment fifty adult houseflies of the CSMA strain were placed in a 2-inch by 5-inch diameter stainless steel cage having screening (14 mesh) at its top and bottom. The flies were sprayed with the above formulation containing the amount of test compound indicated below, and the mortality was observed 2 hours and 24 hours after spraying. The results were as follows:

TABLE I

| Test Chemical | Concn., Percent Actual Chem. (Wt./Vol. liquid sprayed) | Percent Mortality | |
|---|---|---|---|
| | | 2 hrs. | 24 hrs. |
| O-ethyl-S-(N'-methoxy-N'-methyl-acetamido)-N,N-dimethylthio-phosphoramide | 0.35 | 98 | 100 |
| O-ethyl-S-(N'-methoxy-N'-isopropylacetamido)-N-isopropylthiophosphoramide | 0.1 | 100 | 100 |
| Do | 0.35 | 100 | 100 |
| Control | 0.0 | 0 | 0 |

The utility of the compounds of this invention was further illustrated by additional experiments carried out for the control of insects, by feeding. In these experiments, lima bean leaves sprayed on their top and bottom surfaces with the above formulation at the concentraitons indicated below were offered to ten larvae of the Mexican bean bettle (late second instar stage) for a feeding period of 48 hours. After this period mortality was observed. The results were as follows:

TABLE II

| Test Chemical | Concn., Percent Actual Chem. (Wt./Vol. liquid sprayed) | Percent Mortality |
|---|---|---|
| O-ethyl-S-(N'-methoxy-N'-methyl-acetamido)-N,N-dimethylthio-phosphoramide | 0.35 | 100 |
| O-ethyl-S-(N'-methoxy-N'-isopropyl-acetamido)-N-isopropylthiophosphoramide | 0.1 | 100 |
| Do | 0.35 | 100 |
| Control | 0.0 | 0 |

In still another test, the utility of the compounds of this invention as an insecticide was further illustrated by spraying adult pea aphids with the above formulation containing the indicated amount of test compound, transferring the aphids to pea plants also sprayed with the formulation, and observing the mortality after 48 hours. The results were as follows:

TABLE III

| Test Chemical | Concn., Percent Actual Chem. (Wt./Vol. liquid sprayed) | Percent Mortality |
|---|---|---|
| O-ethyl-S-(N'-methoxy-N'-methyl-acetamido)-N,N-dimethylthiophosphoramide | 0.35 | 100 |
| O-ethyl-S-(N'-methoxy-N'-isopropyl-acetamido)-N-isopropylthiophosphoramide | 0.1 | 100 |
| Do | 0.35 | 100 |
| Control | 0.0 | 0 |

The utility of the compounds of the present invention as miticides was illustrated in experiments for the control of strawberry spider mites (*Tetranychus atlanticus*). In these experiments lima bean plants previously infested with from 50 to 100 adults of the mites were dipped into the formulations and held for five days. Thereafter, the adult mortality rate was observed. The results were as follows:

TABLE IV

| Test Chemical | Concn., Percent Actual Chem. (Wt./Vol. liquid sprayed) | Percent Mortality |
|---|---|---|
| O-ethyl-S-(N'-methoxy-N'-methyl-acetamido)-N,N-dimethylthiophosphoramide | 0.35 | 100 |
| O-ethyl-S-(N'-methoxy-N'-isopropyl-acetamido)-N-isopropylthiophosphoramide | 0.1 | 100 |
| Do | 0.35 | 100 |
| Control | 0.0 | 0 |

The compounds of the present invention also have utility as nematocides. This utility was illustrated in experiments for the control of Meloidogyne spp. nematodes. In one experimental procedure, the test chemicals formulated as in the above insecticidal tests at concentrations indicated below were poured on mixtures of soil already infested with nematodes, greenhouse sterilized soil and sand mixed in a ratio of one part infected soil to three parts sterile soil to 1 part sand until this test soil was drenched. After storage of the soil for seven days in open plastic pots with daily watering, tomato plants were transplanted into this soil as a host for the nematodes. Nematode control by the test chemicals was evaluated three to six weeks subsequent to the transplanting by comparison of the degree of galling of the tomato plants in treated and untreated soil. In this experiment, O-ethyl-S-(N'-methoxy-N'-isopropylacetamido)-N-isopropylthiophosphoramide gave the following results:

TABLE V

| Concn., Actual Chem. (lbs./4 inch acre) | Percent Control | Phytotoxicity [1] |
|---|---|---|
| 20 | 100 | 0 |
| 100 | 100 | 2.0 |
| Control | 18.5 galls/plant | |

[1] Phytotoxicity based on 0–10 index. 0 indicates no damage and 10 death.

The utility of the compounds of the present invention as nematocides was further illustrated employing another experimental procedure. In this experiment, the test chemicals were formulated as described above at concentrations indicated below. The soil mixtures were also the same as above (i.e. one part infected soil to 3 parts sterile soil to 1 part sand). The test chemical was added to the soil and the soil and chemical were mixed by shaking and kneading the soil in a polyethylene bag. The bag of treated soil was then placed in a 1-pint widemouth Mason jar, tightly sealed, and the jars were stored for seven days at a constant temperature of 76° F. After the seven day storage, the soil was transferred from the bag to clean plastic pots on a greenhouse bench and the soil was kept moist for an additional seven days. Next, a tomato plant was transplanted into the pot and allowed to grow for three to six weeks, after which time the soil was washed from the tomato roots and the galls on the roots were counted. The degree of nematode control by the test chemicals was evaluated by comparison of the degree of galling of tomato plants in treated and untreated soil. In this experiment, O-ethyl-S-(N'-methoxy-N'-isopropylacetamido)-N-isopropylthiophosphoramide gave the following results:

TABLE VI

| Concn., Actual Chem. (lbs./4 inch acre) | Percent Control | Phytotoxicity[1] |
|---|---|---|
| 1.02 | 100 | 0 |
| 2.56 | 100 | 0 |
| 6.4 | 100 | 0 |
| 16.0 | 100 | 0.3 |
| 40.0 | 100 | 1.3 |
| 100.0 | 100 | 4.0 |
| Control | | 12 galls/plant |

[1] Phytotoxicity based on 0–10 index. 0 indicates no damage and 10 death.

I claim:
1. A compound of the formula:

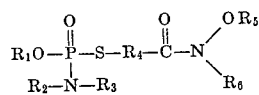

wherein $R_1$, $R_2$, $R_3$, $R_5$ and $R_6$ are independently selected from the group consisting of hydrogen and alkyl; and $R_4$ is an alkylene group.

2. A compound of the formula:

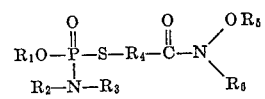

wherein $R_1$, $R_2$, $R_3$, $R_5$ and $R_6$ are independently selected from the group consisting of hydrogen and alkyl containing from one to ten carbon atoms; and $R_4$ is an alkylene group containing from one to ten carbon atoms.

3. A compound of the formula:

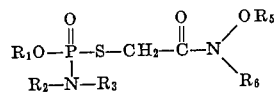

wherein $R_1$, $R_2$, $R_3$, $R_5$ and $R_6$ are independently selected from the group consisting of hydrogen and alkyl containing from one to four carbon atoms.

4. O - ethyl - S - (N' - methoxy - N' - methylacetamido) - N,N - dimethylthiophosphoramide.
5. O - ethyl - S - (N' - methoxy - N' - isopropylacetamido) - N - isopropylthiophosphoramide.
6. O - isopropyl - S - (N' - methoxy - N' - methylacetamido) - N - isopropylthiophosphoramide.
7. O - ethyl - S - (N' - methoxy - N' - methylacetamido) - N - sec - butylthiophosphoramide.
8. O - ethyl - S - (N' - ethoxy - N' - ethylacetamido) - N - isopropylthiophosphoramide.
9. O - sec - butyl - S - (N' - methoxy - N' - methylacetamido)-N-isopropylthiophosphoramide.
10. O - ethyl - S - (N' - methoxy - N' - methylacetamido) - N,N - diisopropylthiophosphoramide.

References Cited
FOREIGN PATENTS
923,702  4/1963  Great Britain.

CHARLES B. PARKER, *Primary Examiner.*
A. H. SUTTO, *Assistant Examiner.*

UNITED STATES PATENT OFFICE
CERTIFICATE OF CORRECTION

Patent No. 3,342,905                                  September 19, 1967

Sidney B. Richter

It is hereby certified that error appears in the above numbered patent requiring correction and that the said Letters Patent should read as corrected below.

Column 2, line 27, for "isoproxy" read -- isopropoxy --; column 3, line 10, for "-N,N'-" read -- -N,N- --; line 12, for "$C_8H_{19}O_4PS$" read -- $C_8H_{19}N_2O_4PS$ --; line 61, for "10.94" and "9.73" read -- 10.94% -- and -- 9.73% --; column 5, lines 24 to 28, for the portion of the formula reading

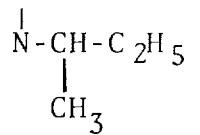  read  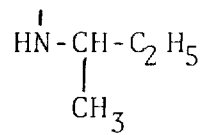

same column 5, lines 53 to 56, for that portion of the formula reading

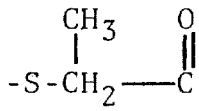  read  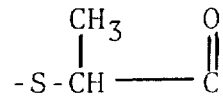

column 6, line 28, for "butylthionophosphchloridate" read -- butylthionophosphochloridate --; column 9, line 33, for "Mortalit" read -- Mortality --.

Signed and sealed this 29th day of October 1968.

(SEAL)
Attest:

EDWARD M. FLETCHER, JR.                        EDWARD J. BRENNER
Attesting Officer                                     Commissioner of Patents